(No Model.) 7 Sheets—Sheet 3.
J. W. HORNER.
APPARATUS FOR STOPPERING AND SEALING JARS.
No. 531,941. Patented Jan. 1, 1895.
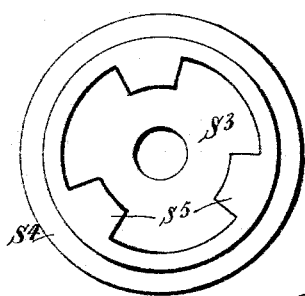
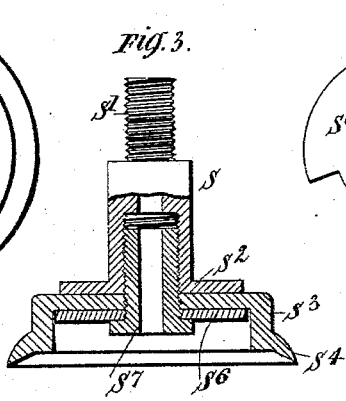
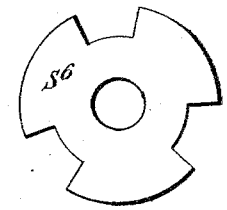
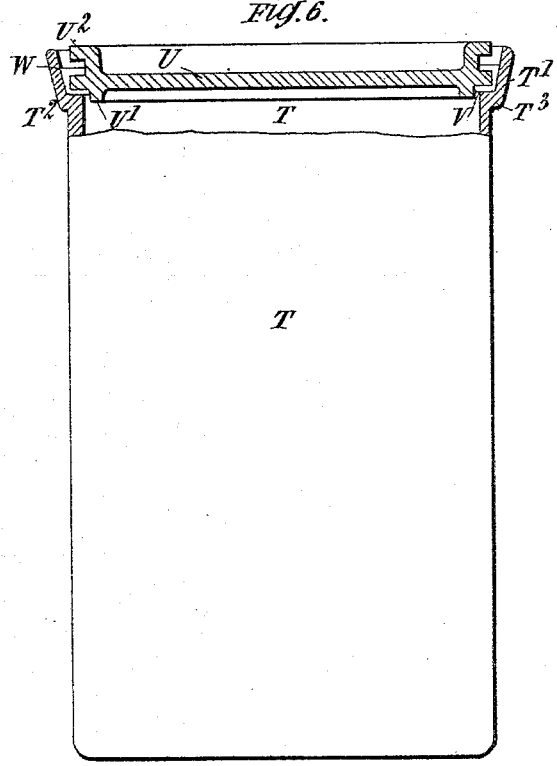
Witnesses:
G. W. Rea,
Thos. A. Green
Inventor:
Jarvis W. Horner,
By James L. Norris
Atty (No Model.)  7 Sheets—Sheet 4.
J. W. HORNER.
APPARATUS FOR STOPPERING AND SEALING JARS.
No. 531,941. Patented Jan. 1, 1895.

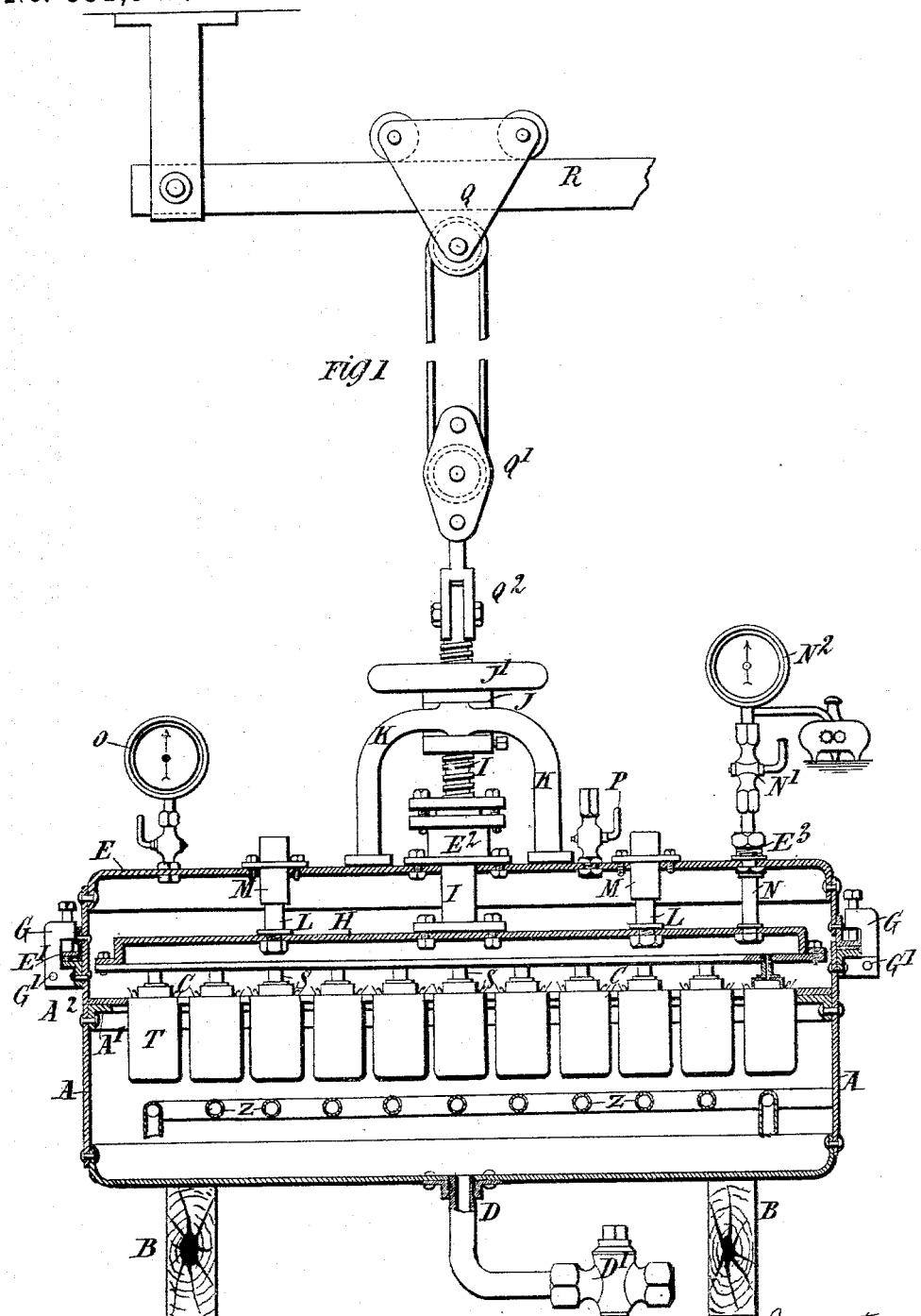

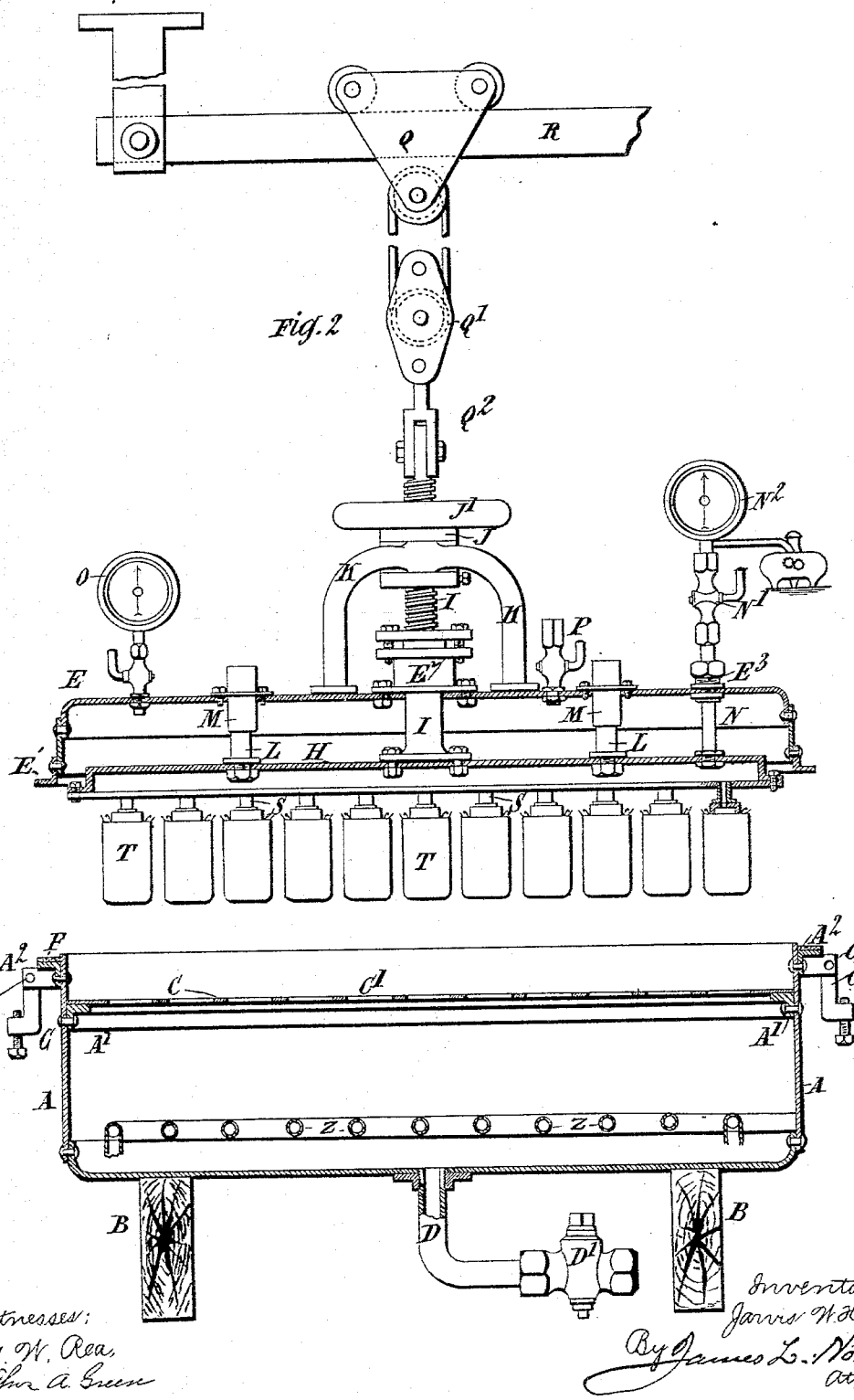

Witnesses:
G. W. Rea.
Thos. A. Green

Inventor.
Jarvis W. Horner,
By James L. Norris.
Atty.

(No Model.) 7 Sheets—Sheet 5.
J. W. HORNER.
APPARATUS FOR STOPPERING AND SEALING JARS.
No. 531,941. Patented Jan. 1, 1895.

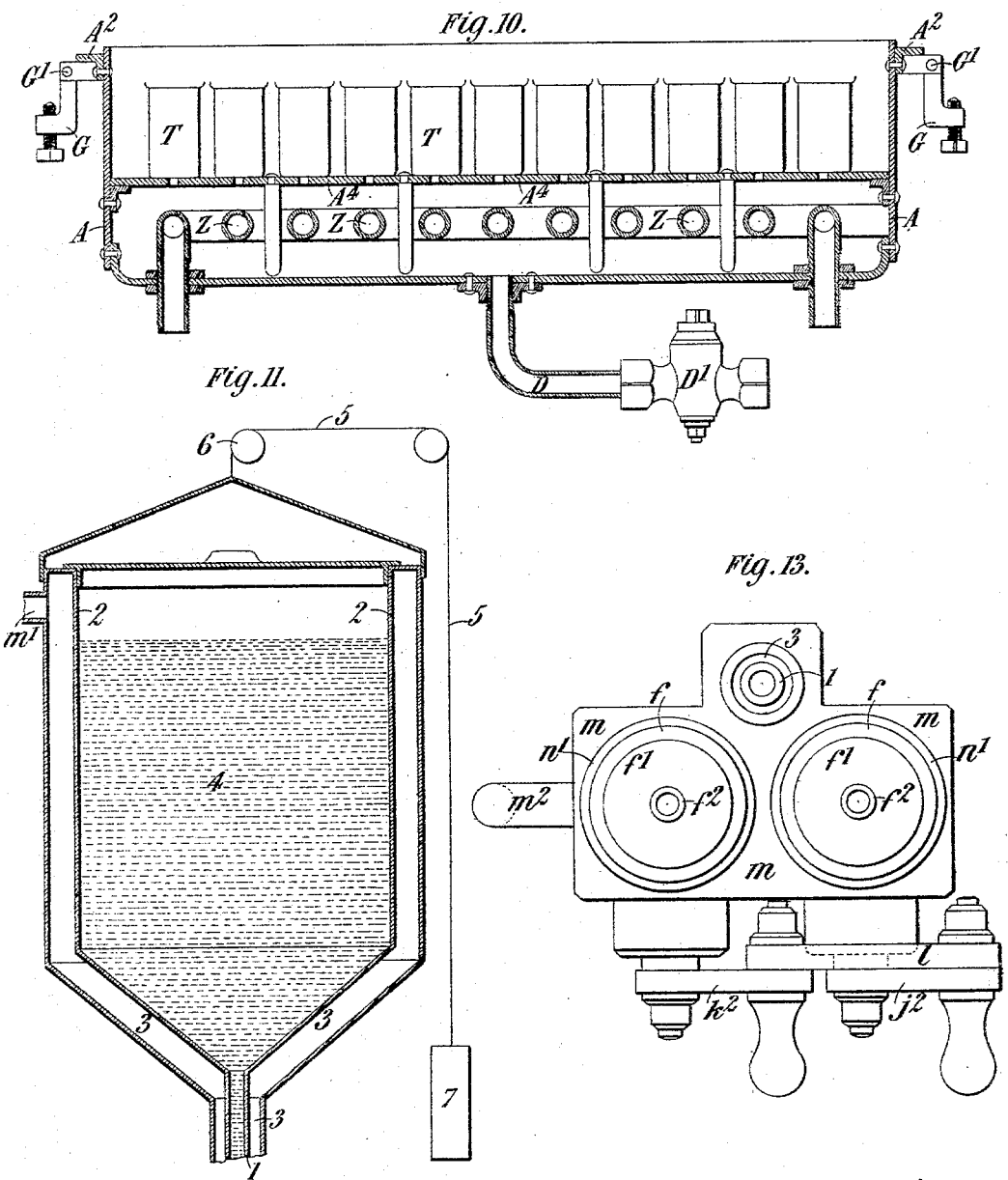

(No Model.) 7 Sheets—Sheet 7.
J. W. HORNER.
APPARATUS FOR STOPPERING AND SEALING JARS.

No. 531,941. Patented Jan. 1, 1895.

Witnesses.
Robert Everett
A. H. Norris.

Inventor.
Jarvis W. Horner.
By James L. Norris.
Atty.

UNITED STATES PATENT OFFICE.

JARVIS WILLIAM HORNER, OF SHEFFIELD, ENGLAND.

APPARATUS FOR STOPPERING AND SEALING JARS.

SPECIFICATION forming part of Letters Patent No. 531,941, dated January 1, 1895.

Application filed May 24, 1894. Serial No. 512,327. (No model.)

*To all whom it may concern:*

Be it known that I, JARVIS WILLIAM HORNER, analyst, a subject of the Queen of Great Britain, residing at Sheffield, in the county of York, England, have invented a certain new and useful Apparatus for Stoppering and Sealing Jars, of which the following is a specification, reference being had to the accompanying drawings.

My invention relates to an improved apparatus for stoppering and sealing jars and the like.

The object of my said invention is to enable a partial vacuum to be formed in jars and the like, and to enable the said jars or the like to be subsequently stoppered or sealed or stoppered and sealed with facility during the maintenance of the vacuum and then removed in batches with great ease and rapidity from the apparatus in which the production of the vacuum and the action of stoppering is effected.

In order that my said invention may be clearly understood I will now proceed to describe the same with reference to the accompanying drawings, wherein—

Figure 7:
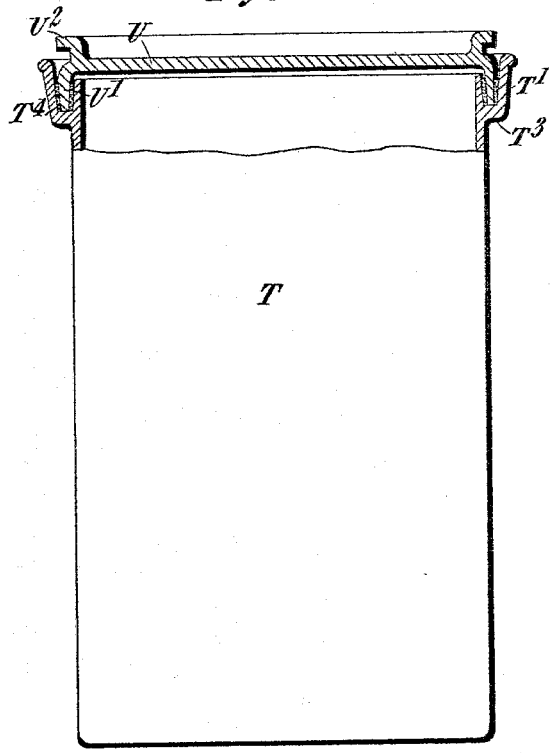
Figure 8:
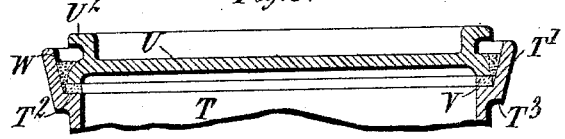
Figure 9:
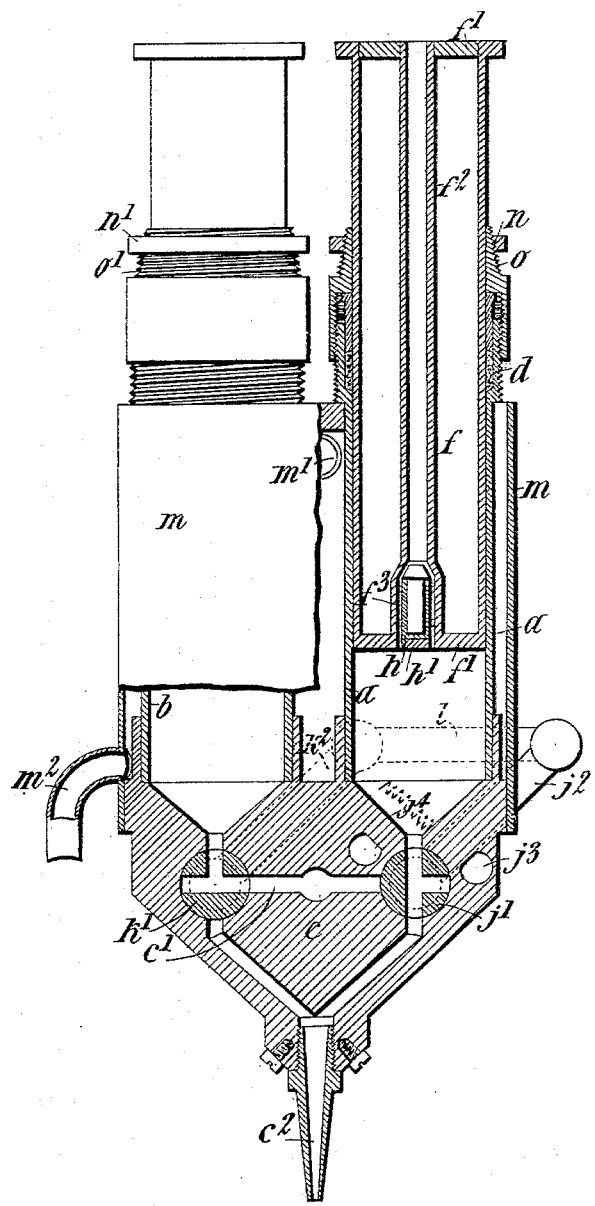
Figure 12:
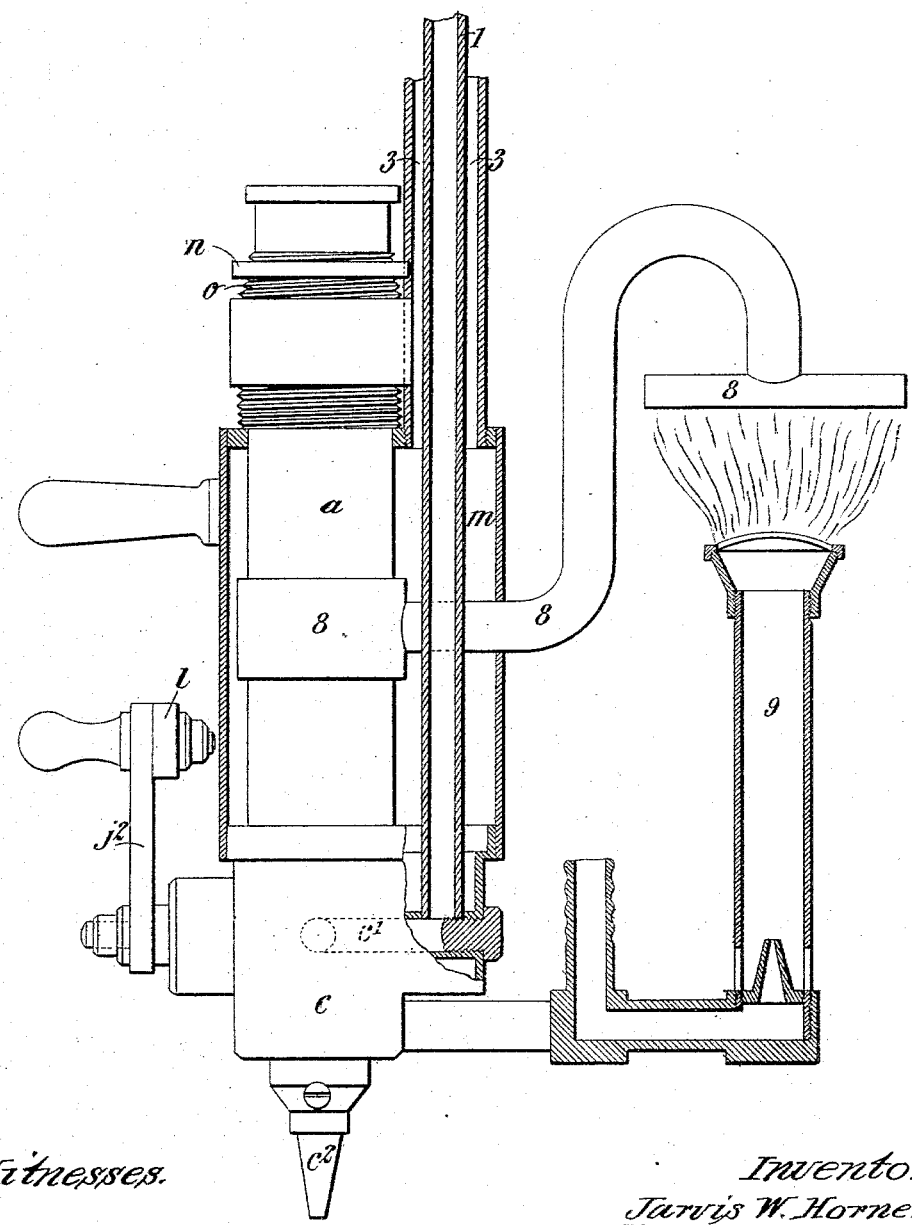

Figure 1 shows in transverse section, apparatus constructed according to this invention wherein the vacuum is produced and the operation of stoppering performed, and shows in elevation, the stoppered jars or the like in the apparatus. Fig. 2 is a similar view showing the stoppered jars raised out of the said apparatus by a special appliance forming part of my invention. Fig. 3 is a vertical central section of a detail of Fig. 1 hereinafter particularly described. Figs. 4 and 5 are an under side view and plan, respectively, of parts of the device shown in Fig. 3. Figs. 6, 7 and 8 are partial sections of forms of improved stoppered jars constructed according to this invention. Fig. 9 is a vertical central section of a device employed to supply wax to the jars to seal them. Fig. 10 is a transverse section of a modified form of apparatus, showing a perforated supporting plate for the jars and a heating coil within the vat. Fig. 11 is a vertical central section of a vessel for supplying the melted wax or the like to the sealing device. Fig. 12 is a vertical central section of the receivers showing the means of connection with the vessel 2, Fig. 11, and also showing an alternative method of heating the wax contained in the same. Fig. 13 is a plan of the sealing device, showing the jacketed tube connecting the receiver and the vessel shown in Fig. 11.

Like reference letters and numerals indicate corresponding parts throughout the drawings.

A is a vat adapted to contain liquid and suitably supported on bearers B. It is provided with an internal flange A' and an external flange $A^2$. The internal flange A' supports a perforated plate C, each perforation C' of which is adapted to receive a jar, bottle, or the like. A shoulder or any other suitable projection is provided at the neck of each jar to prevent it from passing right through the perforation.

D is a pipe, and D' a cock therein, through which the liquid contained in the vat A may be blown out or drained away as desired. A heating coil Z, Figs. 1, 2 and 10, is placed in the vat A or any other suitable means is employed to heat the liquid contents of the vat, for a purpose hereinafter specified.

E is a cover, flanged externally at E' and supported upon the external flange $A^2$ of the vat, a layer of packing F being placed between the two flanges, as shown.

G G are screw clamps, hinged to the vat at G and adapted to press the said two flanges together to insure the maintenance of a sufficiently tight joint between them.

H is a closed chamber, attached to the lower end of a screw threaded spindle I which extends to the exterior of the cover E through a stuffing box $E^2$. The screw threaded portion of the said spindle passes through a nut J which is provided with a hand-wheel J' and turns in bearings in standards K fixed upon the cover.

L L are guide rods fixed to the chamber H. M M are guides into which the guide rods enter, to guide and steady the chamber H in its vertical movement.

N is a pipe communicating with the interior of the chamber H and passing to the exterior of the cover through a stuffing box $E^3$ on the latter. This pipe slides in the said stuffing box when the chamber H is moved, and is provided with a two way cock N' by which it may be put into communication with the gage N² and a suitable air pump or exhauster.

O is a gage attached to the cover E, to indicate the amount of fluid pressure existing thereunder.

P is a pet cock.

Q is is traveler the construction of which is well understood. The block Q' thereof is connected by a shackle Q² with the head of the spindle I.

R is a joist upon which the traveler runs.

To the under side of the chamber H are secured, by any suitable means, suction devices S, one of which is illustrated in detail by Figs. 3, 4 and 5. Each device is situated directly over a jar in the vat, and comprises a hollow spindle S' provided with a flange S² and adapted to be screwed into the under side of the chamber H as shown, a centrally perforated cup S³ of india rubber placed below the flange S² and provided with a tapered circumferential lip or flange S⁴ and with blocks S⁵ extending radially inward from the circumference of the cup toward its center, a perforated washer S⁶ placed below the cup, and recessed, in places, to clear the blocks S⁵, and a perforated flanged screw S⁷ to screw into the lower part of the spindle S' and to hold the washer S⁶ against the part S³, and the latter against the flange S². The blocks limit the downward movement of the cups relatively to the jars in the operation hereinafter described, and prevent undue distortion of the former.

T, T, are the jars, one of which, stoppered, is shown in Fig. 6.

T' is a "flaring" flange formed upon the neck.

T² is an internal ledge and T³ an external shoulder.

U is the stopper or lid provided on its under side with an annular projection U' and on its upper side with an outwardly-turned flange U².

V is a packing-ring of india-rubber or other suitable material which may either be placed on the ledge T² of the jar or placed or sprung upon the projection U' of the lid.

W is a wax or other filling run into the channel between the flange T' and the lid U to make a good joint between the two.

The jar, the stopper, and the projection on the latter, may all be of any shape other than circular, as may be desired.

The jar neck shown by Fig. 8 is similar to that illustrated by Fig. 6 with the exception that the annular ring or projection U' is dispensed with.

The operation of the apparatus is as follows: The cover E is raised clear of the vat A by the traveler Q which acts upon the spindle I and with it raises the cover E, chamber H and their attachments, and the vat A is filled with water, by any suitable means, nearly up to the level of the perforated plate C. The jars T with the stoppers U in place, but not sealed with wax are then dropped into the perforations C' of the plate so that their bottoms dip into the water and their shoulders T³ rest upon the adjacent parts of the plate. Next, the cover E is lowered into place and secured by the clamps G. Then the hand-wheel J' is turned to rotate the nut J in such a direction that the screw-threaded spindle I will be lowered together with the chamber H to bring the flexible lips S⁴ of the cups S³ into close contact with the stoppers U. The closed inner chamber I is now, through the two-way stop-cock N' put into communication with a suitable air-pump or other exhauster, which being put in action will exhaust the air from the said chamber and simultaneously from the interior of the whole of the said rubber cups or suction-devices, and so produce a vacuum therein. Next, the hand-wheel J' is turned to rotate the nut J in such a direction that the screw-threaded spindle I will be raised with the chamber H and its attachments. The external pressure of the atmosphere in the vat will cause the lids or stoppers of the jars to adhere each to its respective cup or suction devices and by the raising of the spindle and chamber the whole of the lids or stoppers will simultaneously be lifted off the jars and held at a distance above them, so as to allow of the free escape of the air and steam from within the jars as hereinafter explained. The cock P is now opened and the water in the vat is heated by any suitable means so that most of the air in the jars expands into the space above the liquid in the vat and together with a considerable amount of the air in the rest of the apparatus goes out with the steam through the cock P which is closed at the expiration of a suitable period. Then the hand wheel J' is turned to rotate the nut J in such a direction that the spindle I will be lowered and the chamber H and stoppers therewith, and the latter will be forced down so as to compress the packing rings V and thus close completely the mouths of the jars. It will be observed that the vacuum in the chamber H and cups S³ has been maintained up to this point. When the stoppers or lids have been forced down upon the jars as described I may blow off or drain out through a suitable trap the hot water by the pipe D at the bottom of the vat, and permit the apparatus to cool down. I may facilitate the cooling, if necessary, by injecting cold water or any other cooling medium into the apparatus, or by otherwise artificially cooling it.

It will be observed that inasmuch as the lids or stoppers have been put back upon the jars while the latter were filled with, and surrounded by an atmosphere of steam, the ingress of air to the jars is effectually prevented, and that when the steam within the jars has condensed a high vacuum will exist within them. If next the cover E be released and raised by the traveler the pressure of the atmosphere will cause the jars and stoppers to adhere to each other and the stoppers to adhere to the cups S³ so that the whole of the jars will rise out of the perforations C' as the chamber H rises and instead of being dealt with singly can be conveyed, in one operation, to a convenient place whereat the cups S³ can be caused to release them to enable the wax filling to be run into place.

It will be obvious that if, from any cause, any of the jars have failed to maintain a vacuum, such jars will not be lifted out of the vat. The stoppers only will go up when the cover of the vat is lifted, and there will be no danger of jars in which the vacuum is imperfect being sealed and passed as right.

To open any jar the wax filling is cut through with any sharp instrument, whereupon any convenient lever with its end placed under the flange $U^2$ can be turned upon the top of the flange T' as a fulcrum to pry the stopper or lid open.

Instead of heating the water after it is put into the vat I may run in water at a sufficiently high temperature from a steam boiler or the like, or otherwise provide for the desired heating effect.

Instead of passing the jars through a perforated plate, upon which they are supported by their flanges they may be arranged to stand on a perforated false-bottom $A^4$, Fig. 10 or may be placed or held in any other convenient manner within the vat, it being understood that each jar has provided directly over it a cup or suction-device for the purpose hereinbefore explained.

In the alternative construction of jar illustrated in Fig. 7, the jar has an annular groove $T^4$ at its mouth, the said groove being preferably made tapering in cross-section as shown. The stopper U is provided with a rim U' of similar, but smaller, cross-section, arranged to dip into and rest on the bottom of the said groove. In this modification I dispense with india-rubber or other packing, and in operating with such jars I run into the groove $T^4$ a suitable quantity of liquid wax or other filling, put the lids or stoppers on the jars, and then put the jars into the vat and proceed as hereinbefore explained up to the point where the water or other heating medium is run off from the vat to facilitate the cooling of the same; but the lids or covers are not thereafter dealt with until the wax or other filling in the grooves of the jars has become "set;" otherwise the liquid wax would be forced by the pressure of the outer air over the inner edges of the grooves into the jars.

I will now proceed to describe the device constructed according to this invention and illustrated in Fig. 9 for supplying the filling of wax or other fluid material to the grooves of the jars. It consists of two similar cylindrical receivers $a, b$ fixed vertically into a block or body-piece $c$. Each receiver is provided at its upper end with a stuffing-box $d$. Through said stuffing-box and into the receiver slides a well-fitting hollow cylindrical piston $f$, closed, top and bottom, by plates $f'$ which are centrally perforated and provided with a tube $f^2$ which lies preferably in the axial line of the piston. In a chamber $f^3$ formed at the lower end of said tube is fitted a hollow valve $h$ for a purpose hereinafter explained. The said valve is supported by a perforated support $h'$. In the body piece $c$ are formed stopcocks having ways as shown, by which the receivers $a$ and $b$ may be put into communication either with a supply or filling channel $c'$ or with a delivery jet $c^2$ which is suitably shaped for delivering the liquid wax into the grooves of the jars. The plugs $j' k'$ of the said stop cocks are connected together by means of levers $j^2$, $k^2$ and a link $l$ so that any motion given to one is simultaneously communicated to the other. The receivers $a$ and $b$ are incased in a jacket $m$ to which steam or hot water may be admitted by a pipe $m'$ for the purpose of maintaining the contents of the receivers in a liquid state. The water of condensation or waste-water is run off by an elbow pipe $m^2$. A spring, is provided for the purpose of forcing the lever $j^2$ against a stop $j^3$ and causing the stopcocks to maintain normally a desired position, the said position being, in the present example, that in which they are shown in the drawings. Another stop $j^4$ is provided for a purpose hereinafter specified. The filling channel $c'$ is connected by a jacketed tube 1 Fig. 12 which may be either flexible metallic or other tubing, or rigid tubing, with a vessel 2 Fig. 11 placed overhead, which vessel is also jacketed, and steam or hot water is admitted at $m'$ Fig. 11 and is caused to circulate in the jacket spaces 3 for the purpose of maintaining the wax or other suitable material 4 which is put into the inner part of the vessel 2 in a liquid state. If the connection between the vessel 2 and the receivers $a$, and $b$ aforesaid is made by means of flexible tubing the overhead vessel 2 may be stationary, but if rigid tubing be used for this purpose, the said overhead vessel will preferably be hung from the end of a cord or chain 5 which passes over a pulley 6 and is provided at its other end with a counterpoise 7 to allow of the delivery apparatus being moved about as desired for the purpose of running the wax on bottles or jars. The jacket space 3 of the connecting tubes 1 is preferably in communication with the receiver jacket $m$ and with the jacket space 3 of the overhead vessel 2 aforesaid. Instead of heating the wax by means of steam or hot water I may heat it, by heat conducted into the apparatus by metallic projections such as that shown at 8, Fig. 12, fixed to convenient parts thereof, the said metallic projections being heated by gas lamps 9 or any other suitable and convenient source of heat. I will now proceed to explain the use of this waxing-apparatus. Into the overhead vessel aforesaid is put paraffin-wax or other suitable wax and the said vessel, the connecting tubing, and delivery apparatus are heated either by steam or hot water circulating in the jackets thereof or by any other of the means heretofore referred to. If now the stopcocks are in the normal position, in which they are shown in the drawings, the melted wax will flow into the receiver $b$, the hollow valve of which, in its normal position, rests upon its perforated support so that a space is left between the conical head of the valve, and the valve-seating for the passage of air expelled from the receiver $b$ by the liquid wax or other filling as it rises in the receiver $b$. When the filling reaches the hollow valve the latter floats up to its seating, to which it is guided by suitable projections and prevents the further rise of wax in the valve-chamber. If now the lever $j^2$ is pulled over to the other stop $j^4$, the receiver which has just been filled as described, will be shut off from the filling channel $c'$, and connected to the jet $c^2$ through which the liquid wax or other filling will run out, and the hollow valve aforesaid by falling away from its seating admits air to the receiver to take its place. The said movement of the lever will shut off the companion receiver $a$ from the delivery jet $c^2$ and connect it to the filling channel $c'$ so that the said companion receiver $a$ will fill while the receiver $b$ first filled is being emptied. It will thus be seen that by the simple movement of a lever between fixed stops, uniform quantities of liquid wax may be run out, without requiring any thought or judgment on the part of the operator. The capacity of the receivers can be altered by pushing in or pulling out the pistons thereof, which after adjustment are fixed in position by the clamping rings $n\ n'$ which screw down on split and tapered parts $o\ o'$ of the stuffing-box nuts and compress them against the walls of the pistons, after the right position of the latter has been determined, by preliminary trial. It will be obvious that by the use of this apparatus the operation of "waxing" the jars will be facilitated and so simplified that it may be intrusted to a young or unskilled attendant.

I claim—

1. The combination of a closed chamber in which jars or the like to be stoppered are placed, a vacuum chamber, suckers carried by the wall of said chamber and adapted to engage with the stoppers of the jars or the like, and means for raising said vacuum chamber with its suckers, substantially as and for the puposes specified.

2. The combination of a closed chamber in which jars or the like to be stoppered are placed, a vacuum chamber, suckers carried by the wall of said chamber and adapted to engage with the stoppers of the jars or the like and means for raising said vacuum chamber with its suckers, means for heating the jars in the vat, substantially as described.

3. In apparatus for stoppering jars or the like, the combination of a vat, an internal flange therein, a perforated plate supported thereon on which the jars or the like rest, a cover to the vat, a vacuum-chamber within the vat, and suckers with flexible lips secured to the said vacuum-chamber, substantially as described.

4. In apparatus for stoppering jars and the like, the combination of a vat, a cover therefor, a vacuum-chamber movable in guides in the cover, flexible-mouthed suckers carried by said chamber, and means for supporting the jars, or the like in the vat, substantially as described.

5. The combination of a vat, a cover therefor, a vacuum-chamber suspended in the cover, guides for the vacuum-chamber, means for adjusting the chamber, which means consist of a screw threaded spindle attached at its lower end to the closed chamber and extending to the exterior of the cover through a stuffing-box thereon, a nut through which one spindle passes provided with a hand-wheel, and bearings in standards attached to the cover in which bearings the spindle turns, substantially as described.

6. In apparatus for stoppering jars or the like, the combination of a vat furnished with means for supporting the jars, a cover therefor, a vacuum chamber movable in guides in the cover, suckers carried by said chamber, each sucker consisting of a hollow spindle provided with a flange, a centrally perforated cup of india-rubber placed below the said flange and having a tapered circumferential lip with blocks extending radially inward from the circumference toward the center, a perforated washer placed below the cup which is recessed in places, and a perforated flanged screw adapted to screw into the lower part of the aforesaid hollow spindle, substantially as shown and described for the purposes specified.

7. In apparatus for sealing jars and the like with wax or other filling, the combination of a jacketed receiver provided at the upper end with a stuffing-box, a piston sliding in said receiver, an air outlet in said piston, and a float valve for closing said air-outlet, substantially as shown and described for the purposes specified.

8. In apparatus for sealing jars and the like with wax or other filling, the combination of a jacketed receiver, a hollow piston or ram working therein, an air-outlet opening in the piston or ram, a float-valve to close said air-outlet, a stuffing-box, and a three-way cock to place the interior of the receiver alternately in communication with the outlet and inlet for the wax, substantially as described.

In witness whereof I have hereunto set my hand this 3d day of May, 1894.

JARVIS WILLIAM HORNER.

Witnesses:
GEO. MOUNT,
MAURICE RAW.